US009433930B2

(12) United States Patent
Nazarpoor (10) Patent No.: US 9,433,930 B2
(45) Date of Patent: Sep. 6, 2016

(54) METHODS FOR SELECTING AND APPLYING A LAYER OF CU—MN SPINEL PHASE TO ZPGM CATALYST SYSTEMS FOR TWC APPLICATION

(71) Applicant: Clean Diesel Technologies, Inc., Oxnard, CA (US)

(72) Inventor: Zahra Nazarpoor, Camarillo, CA (US)

(73) Assignee: Clean Diesel Technologies, Inc. (CDTi), Oxnard, CA (US)

(*) Notice: Subject to any disclaimer, the term of this patent is extended or adjusted under 35 U.S.C. 154(b) by 98 days.

(21) Appl. No.: 14/090,809

(22) Filed: Nov. 26, 2013

(65) Prior Publication Data

US 2015/0148215 A1     May 28, 2015

(51) Int. Cl.
| | | |
|---|---|---|
| *B01J 21/04* | (2006.01) | |
| *B01J 23/24* | (2006.01) | |
| *B01J 23/72* | (2006.01) | |

(Continued)

(52) U.S. Cl.
CPC .......... *B01J 23/8892* (2013.01); *B01D 53/945* (2013.01); *B01J 23/005* (2013.01); *B01J 37/0244* (2013.01); *B01D 2255/209* (2013.01); *B01D 2255/2073* (2013.01); *B01D 2255/20715* (2013.01); *B01D 2255/20761* (2013.01); *B01D 2255/40* (2013.01); *B01D 2255/65* (2013.01);

(Continued)

(58) Field of Classification Search
CPC ...... B01J 21/005; B01J 21/04; B01J 21/066; B01J 23/34; B01J 23/72; B01J 23/8892
USPC ................ 502/345, 354, 355, 324, 349, 524
See application file for complete search history.

(56) References Cited

U.S. PATENT DOCUMENTS

| | | | |
|---|---|---|---|
| 8,845,987 B1 * | 9/2014 | Nazarpoor et al. | ........ 423/213.2 |
| 2006/0120936 A1 | 6/2006 | Alive et al. | |

(Continued)

FOREIGN PATENT DOCUMENTS

| | | | | |
|---|---|---|---|---|
| CN | 10-2172527 | * | 9/2011 | ............. B01D 53/72 |
| CN | 102172527 A | | 9/2011 | |

(Continued)

OTHER PUBLICATIONS

PCT Notification of Transmittal of the International Search Report and Written Opinion of the International Searching Authority, or the Declaration, dated Feb. 4, 2015.

*Primary Examiner* — Patricia L Hailey
(74) *Attorney, Agent, or Firm* — Alston & Bird LLP (57) ABSTRACT

The present disclosure relates to selecting the layer of applying ZPGM active phase in washcoat, or applying ZPGM active phase in overcoat, for achieving optimized performance and enhanced thermal stability. Applying ZPGM active phase catalyst in overcoat shows improvements compare to applying ZPGM active phase in washcoat. The selected active phase material may include a chemical composition that is substantially free from PGM, including a formulation of stoichiometric Cu—Mn spinel structure active phase deposited on Niobium-Zirconium support oxide. The selected active phase layer applied in overcoat may include a washcoat of alumina coated on a suitable ceramic substrate. The disclosed active phase may be applied in overcoat to maximize efficiency of catalyst systems, which may exhibit enhanced catalytic activity properties, which may stable after aging and under steady state and oscillating condition, showing optimized performance purifying gases in TWC condition.

18 Claims, 7 Drawing Sheets

(51) Int. Cl.
    *B01J 23/889*     (2006.01)
    *B01J 37/02*     (2006.01)
    *B01J 23/00*     (2006.01)
    *B01D 53/94*     (2006.01)
    *B01J 37/03*     (2006.01)

(52) U.S. Cl.
    CPC ............ *B01J 37/035* (2013.01); *B01J 37/038* (2013.01); *B01J 2523/00* (2013.01)

(56) References Cited

U.S. PATENT DOCUMENTS

2009/0324468 A1* 12/2009 Golden et al. ............... 423/210
2013/0115144 A1   5/2013  Golden et al.
2014/0271387 A1*  9/2014  Nazarpoor .................. 422/170
2014/0274678 A1*  9/2014  Nazarpoor .................. 502/324
2014/0357479 A1* 12/2014  Nazarpoor et al. .......... 502/302
2015/0105245 A1*  4/2015  Nazarpoor et al. .......... 502/324
2015/0105247 A1*  4/2015  Nazarpoor et al. .......... 502/324
2015/0148222 A1*  5/2015  Nazarpoor .................. 502/324
2015/0148224 A1*  5/2015  Nazarpoor et al. .......... 502/324

FOREIGN PATENT DOCUMENTS

EP     1 256 382 A2   11/2002
WO   2015/081184   *  6/2015  ............. B01J 23/00

* cited by examiner

METHODS FOR SELECTING AND APPLYING A LAYER OF CU—MN SPINEL PHASE TO ZPGM CATALYST SYSTEMS FOR TWC APPLICATION

CROSS-REFERENCE TO RELATED APPLICATIONS

N/A

BACKGROUND

1. Field of the Disclosure

This disclosure relates generally to catalyst systems and more particularly to a method for selecting the layer in which a Cu—Mn spinel structure active phase may be applied to enhance performance of ZPGM catalyst systems for TWC application.

2. Background Information

Internal combustion engines produce exhaust gases having compositions that oscillate over time between air/fuel ratios that are slightly rich of stoichiometric, and ratios that are slightly lean of stoichiometric. However, a common problem among conventional active phase catalysts may be related to NO and CO conversion efficiency, which may fall very rapidly when the engine is operated outside of that band of air/fuel ratios. Under lean engine operations, there is excess oxygen and the reduction of NOx is not favored. Under rich conditions, the excess of fuel consumes all of the available oxygen prior to the catalyst.

Common three way catalysts (TWC) may work by converting carbon monoxide, hydrocarbons, and nitrogen oxides into less harmful compounds or pollutants. A lack of sufficient oxygen may occur either when oxygen derived from NOx reduction is unavailable, or when certain maneuvers such as hard acceleration enrich the mixture beyond the ability of the converter to supply oxygen, as the TWC catalyst deteriorates because of aging, its ability to store oxygen diminishes, and the efficiency of the catalytic converter decreases.

Recent environmental concerns for a catalyst's high performance have increased the focus on the operation of a TWC catalyst at the end of its lifetime. Catalytic materials used in TWC applications have also changed, and the new materials requires being thermally stable under the fluctuating exhaust gas conditions.

Consequently, prior art TWC catalyst preferably use platinum group metal (PGM), which in turn drives up their cost and therefore the cost of catalysts applications. Accelerated catalyst reaction and enhanced performance is desirable, which is particularly important for meeting increasingly stringent state and federal government vehicle emissions standards. Therefore, there is a continuing need to provide cost effective catalyst systems that is free of PGM (ZPGM) and can provide sufficient conversion so that HC, NOx, and CO emission standards can be satisfied.

For the foregoing reasons, there is a need of selecting a layer for applying ZPGM active phase in washcoat, or in overcoat, which may produce an optimized TWC catalyst systems, employing a formulation substantially free of PGM and RE metals for washcoat or overcoat catalyst compositions, capable to achieve similar or better performance in TWC condition.

SUMMARY

It is an object of the present disclosure, to provide a ZPGM metals active phase catalyst applied in overcoat for optimal performance of catalyst systems in TWC condition. The optimized effect of active phase catalyst may be achieved after application of stoichiometric Cu—Mn spinel structure active phase in overcoat with Niobium-Zirconium support oxide, which may be prepared employing co-precipitation synthesis method, for achieving enhanced activity, and better thermal stability during aging.

According to an embodiment, the composition of the active phase in WC or in OC within disclosed ZPGM catalyst system may include a Cu—Mn stoichiometric spinel phase with Niobium-Zirconia support oxide, where the material may be dried and calcined at about 600° C. to form a spinel structure.

According to embodiments in the present disclosure, fresh and hydrothermally aged samples of ZPGM metal catalyst may be prepared to analyze/measure the catalytic activity of the Cu—Mn spinel active phase with Niobium-Zirconium support oxide applied in washcoat, to compare with corresponding samples with Cu—Mn spinel active phase with Niobium-Zirconium support oxide applied in overcoat. Comparison may include the catalytic activity, effects, and influence of applying active phase in washcoat or applying active phase in overcoat to compare the stability of both catalysts after aging under steady state and oscillating condition for selecting the best performance in TWC condition.

The selected layer for optimized performance in TWC condition may include applying active phase in OC, with a chemical composition substantially free from PGM, such as Cu—Mn spinel structure active phase with Niobium-Zirconium support oxide applied in OC, which may include a WC of pure alumina applied on a suitable ceramic substrate.

According to an embodiment of the present disclosure, the NO/CO and NO/HC cross over R value of disclosed ZPGM catalyst system may be determined by performing steady state sweep test and oscillating sweep test, employing fresh and hydrothermally aged catalyst samples prepared with Cu—Mn spinel active phase applied in washcoat, to compare performance and catalytic activity with corresponding samples with Cu—Mn spinel active phase applied in overcoat According to an embodiment, the steady state light-off test may be performed at selected R value of NO/CO cross over obtained from sweep test, which may indicate the configuration of enhanced active phase layer selected for subsequent evaluation under a steady state light-off test, depending on the R value at NO/CO cross over may produce enhanced catalytic performance in NO, CO, and HC conversion.

The present disclosure may provide solutions for optimized performance of catalyst systems, employing an active phase catalyst substantially free of PGM, for achieving enhanced stability during aging and better performance in TWC condition.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DETAILED DESCRIPTION

In the following detailed description, reference is made to the accompanying drawings, which form a part hereof. In the drawings, which are not necessarily to scale or to proportion, similar symbols typically identify similar components, unless context dictates otherwise with emphasis being placed upon illustrating the principles of the invention. The illustrative embodiments described in the detailed description, drawings and claims, are not meant to be limiting. Other embodiments may be used and/or other changes may be made without departing from the spirit or scope of present disclosure.

DEFINITIONS

As used here, the following terms may have the following definitions:

"Platinum group Metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat layer.

"Milling" refers to the operation of breaking a solid material into a desired grain or particle size.

"Co-precipitation" may refer to the carrying down by a precipitate of substances normally soluble under the conditions employed.

"Calcination" refers to a thermal treatment process applied to solid materials, in presence of air, to bring about a thermal decomposition, phase transition, or removal of a volatile fraction at temperatures below the melting point of the solid materials.

"R value" refers to the number obtained by dividing the reducing potential by the oxidizing potential of materials in a catalyst.

"Rich condition" refers to exhaust gas condition with an R value above 1.

"Lean condition" refers to exhaust gas condition with an R value below 1.

"Air/Fuel ratio" or "A/F ratio" refers to the weight of air divided by the weight of fuel.

"Three-Way Catalyst" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

DESCRIPTION OF THE DRAWINGS

The present disclosure may generally provide methods for selecting the layer of active phase site in a WC only or in an OC using a formulation of ZPGM metals.

Washcoat only, in an embodiment of the present disclosure, washcoat only may include a suitable cordierite ceramic substrate with WC consisting in Cu—Mn spinel structure active phase catalyst with Nb2O5-ZrO$_2$ Support oxide.

Washcoat and overcoat, in another embodiment of the present disclosure may include a suitable ceramic substrate and WC consisting in pure alumina (Al$_2$O$_3$), and OC consisting in active phase, which may include Cu—Mn spinel structure with Nb$_2$O$_5$—ZrO$_2$ support oxide.

Composition and Preparation of Active Phase Catalyst Material

The disclosed active phase catalyst material may include a chemical composition that is practically free from PGM, which may be used for a large number of catalyst applications, and more particularly, in TWC systems. The material may be prepared from a stoichiometric Cu—Mn spinel structure, $Cu_{1.0}Mn_{2.0}O_4$, supported on Nb$_2$O$_5$—ZrO$_2$ by using co-precipitation method or any other preparation technique known in the art.

The preparation of disclosed active phase catalyst material may begin by milling Nb$_2$O$_5$—ZrO$_2$ support oxide to make aqueous slurry. The Nb$_2$O$_5$—ZrO$_2$ support oxide may have Nb$_2$O$_5$ loadings of about 15% to about 30% by weight, preferably about 25% and ZrO$_2$ loadings of about 70% to about 85% by weight, preferably about 75%.

The Cu—Mn solution may be prepared by mixing from about 1 to about 2 hours, the appropriate amount of Mn nitrate solution (MnNO$_3$) and Cu nitrate solution (CuNO$_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on Nb$_2$O$_5$—ZrO$_2$ support oxide aqueous slurry, for which an appropriate amount of one or more of sodium hydroxide (NaOH) solution, sodium carbonate (Na$_2$CO$_3$) solution, ammonium hydroxide (NH$_4$OH) solution, tetraethyl ammonium hydroxide (TEAH) solution, and other suitable base solutions may be added to the Cu—Mn/Nb$_2$O$_5$—ZrO$_2$ slurry. For the precipitation process, the pH of the Cu—Mn/Nb$_2$O$_5$—ZrO$_2$ slurry may be adjusted at the range of about 7-9 using suitable base solution by adding appropriate amount of base solution. The precipitated slurry may be aged for a period of time of about 12 to 24 hours under continued stirring at room temperature.

For preparation of active phase catalyst material, after precipitation step, the slurry may undergo filtering and washing, where the resulting material may be dried overnight at about 120° C. and subsequently calcined at a suitable temperature within a range of about 550° C. to about 650° C., preferably at about 600° C. for about 5 hours. The prepared powder of disclosed active phase catalyst material, according to principles in the present disclosure, may be used for a variety of catalyst system applications, particularly TWC systems.

According to principles in the present disclosure, active phase catalyst material may be used as coating layer on substrate, using a cordierite material with honeycomb structure, where substrate may have a plurality of channels with suitable porosity. The active phase catalyst material in form of aqueous slurry of Cu—Mn/$Nb_2O_5$—$ZrO_2$ may be deposited on the suitable substrate to form a washcoat or overcoat, employing vacuum dosing and coating systems. In the present disclosure, a plurality of capacities of WC or OC loadings may be coated on a suitable substrate. The plurality of WC or OC loading may vary from about 60 g/L to about 200 g/L, in this disclosure particularly about 120 g/L. Subsequently, after deposition on substrate of the suitable loadings of Cu—Mn/$Nb_2O_5$—$ZrO_2$ slurry, the WC or OC may be treated.

According to embodiments in the present disclosure, treatment of the WC or OC may be enabled employing suitable drying and heating processes. A commercially-available air knife drying systems may be employed for drying the WC or OC. Heat treatments may be performed using commercially-available firing (calcination) systems. The treatment may take from about 2 hours to about 6 hours, preferably about 4 hours, at a temperature within a range of about 550° C. to about 650° C., preferably at about 600° C.

A suitable active phase catalyst material deposited on substrate may have a chemical composition with a total loading of about 120 g/L, including a Cu—Mn spinel structure with copper loading of about 10 g/L to about 15 g/L and manganese loading of about 20 g/L to about 25 g/L. The $Nb_2O_5$—$ZrO_2$ support oxide may have loadings of about 80 g/L to about 90 g/L.

When the Cu—Mn spinel structure active phase on $Nb_2O_5$—$ZrO_2$ support oxide slurry may be used to form an OC, the WC may include a composition of pure alumina ($Al_2O_3$) using loading of 60 g/L to about 200 g/L, preferably about 120 g/L.

According to principles in the present disclosure, fresh and aged samples of ZPGM for each selected layer of active phase, i.e., WC only or in an OC, may be subjected to testing under steady state, and oscillating sweep condition to determine the R values at NO/CO cross over at a selected temperature to compare performance and subsequently, a light-off test may be performed under lean/rich condition depending on the measured R value and the selected optimal activity in conversion at NO/CO cross over.

Example #1 for Applying Active Phase in WC Only

Preparation of Example #1 for applying active phase in WC only, may include samples of Cu—Mn spinel structure active phase with $ZrO_2$—$Nb_2O_5$ which may be synthesized by co-precipitation method and may include preparation steps for applying active phase in WC only, which may begin by milling separately the support oxide $Nb_2O_5$—$ZrO_2$ to make the slurry. Make solution of Cu nitrate and Mn nitrate with the stoichiometric of $CuMn_2O_4$ spinel structure active phase slurry and mix for about 1 to about 2 hours. Subsequently mix Cu—Mn nitrate solution with support oxide slurry for about 2 to about 4 hours.

For precipitation of Cu—Mn nitrate solution on $Nb_2O_5$—$ZrO_2$ support oxide aqueous slurry, an appropriate amount of one or more of sodium hydroxide (NaOH) solution, sodium carbonate ($Na_2CO_3$) solution, ammonium hydroxide ($NH_4OH$) solution, tetraethyl ammonium hydroxide (TEAH) solution and other suitable base solutions may be added to the Cu—Mn/$Nb_2O_5$—$ZrO_2$ slurry. For the precipitation process, the pH of the Cu—Mn/$Nb_2O_5$—$ZrO_2$ slurry may be adjusted at the range of about pH 7-9, preferably within about pH 8-8.5, adding appropriate amount of base solution as described. The precipitated slurry may be aged for a period of time of about 12 to 24 hours under continued stirring at room temperature.

The aqueous slurry of Cu—Mn/$Nb_2O_5$—$ZrO_2$ may be coated on suitable ceramic substrate using a cordierite material with honeycomb structure, which may have a plurality of channels with suitable porosity, to form a washcoat. In this example, a capacity of about 120 g/L of WC loadings may be coated on a suitable substrate. Subsequently, after deposition on substrate of the suitable loadings of Cu—Mn/$Nb_2O_5$—$ZrO_2$ slurry, the washcoat may be treated at a temperature of about 600° C. for about 5 hours.

Example #2 for Applying Active Phase in OC

Example #2 may include samples which may be synthesized by co-precipitation method, including preparation steps for applying active phase in OC, which may require a washcoat.

Preparation may start by preparing the WC, which may include alumina ($Al_2O_3$) with loading of 120 g/L. WC samples may be prepared by milling $Al_2O_3$ to make the slurry and coat on a suitable ceramic substrate using a cordierite material with honeycomb structure, with loading of 120 g/L, then treated at about 550° C. for about 4 hours.

Preparation of OC may begin by milling support oxide $Nb_2O_5$—$ZrO_2$ separately and make slurry. Make solution of Cu nitrate and Mn nitrate with stoichiometric of $Cu_{1.0}Mn_2O_4$, mix for about 1 to about 2 hours. Subsequently, mix Cu—Mn nitrate solution with support oxide slurry for about 2 to about 4 hours. Precipitate with base solution of Cu—Mn nitrate solution on $Nb_2O_5$—$ZrO_2$ support oxide aqueous slurry, an appropriate amount of one or more of sodium hydroxide (NaOH) solution, sodium carbonate ($Na_2CO_3$) solution, ammonium hydroxide ($NH_4OH$) solution, tetraethyl ammonium hydroxide (TEAH) solution, and other suitable base solutions may be added to the Cu—Mn/$Nb_2O_5$—$ZrO_2$ slurry. For the precipitation process, the pH of the Cu—Mn/$Nb_2O_5$—$ZrO_2$ slurry may be adjusted at the range of about 7-9, preferably within about 8-8.5, adding appropriate amount of base solution as described. The precipitated slurry may be aged for a period of time of about 12 to 24 hours under continued stirring at room temperature.

The aqueous slurry of Cu—Mn/$Nb_2O_5$—$ZrO_2$ may be deposited on suitable substrate, which may have already WC layer, to form an OC layer. Subsequently, after deposition of OC with the suitable loadings of Cu—Mn/$Nb_2O_5$—$ZrO_2$ slurry, about 120 g/L of OC loadings, the OC may be treated at a temperature of about 600° C. for about 5 hours.

According to an embodiment, the steady state sweep test and oscillating sweep test may be performed employing fresh and aged samples coated with active phase layer applied in a WC or OC for comparison of test results to select the best performance of NO, CO, and HC conversion, employing fresh and thermally aged samples, which may be prepared according with formulation and instructions of Example #1 and Example #2.

Steady State Sweep Test Procedure

The steady state sweep test may be carried out employing a test reactor increasing the inlet temperature to about 450° C., employing 11-point R values from about 2.0 (rich condition) to about 0.80 (lean condition) to measure the CO, NO, and HC conversions at hydrothermal temperature of 450° C. selected because of the application of underflow condition.

The space velocity (SV) may be adjusted from about 40,000 h$^{-1}$ to about 60,000 h$^{-1}$. The gas feed employed for the test may be a standard TWC gas composition, with variable $O_2$ concentration in order to adjust R value from rich condition to lean condition during testing. The standard TWC gas composition may include about 8,000 ppm of CO, about 400 ppm of $C_3H_6$, about 100 ppm of $C_3H_8$, about 1,000 ppm of NOx, about 2,000 ppm of $H_2$, 10% of $CO_2$, and 10% of $H_2O$. The quantity of $O_2$ in the gas mix may be oscillated to represent the three-way condition of the control loop.

The following examples are intended to illustrate the scope of the disclosure. It is to be understood that other procedures known to those skilled in the art may alternatively be used.

Steady State Sweep Test of ZPGM Catalysts with Active Phase in WC or OC

Figure 1:
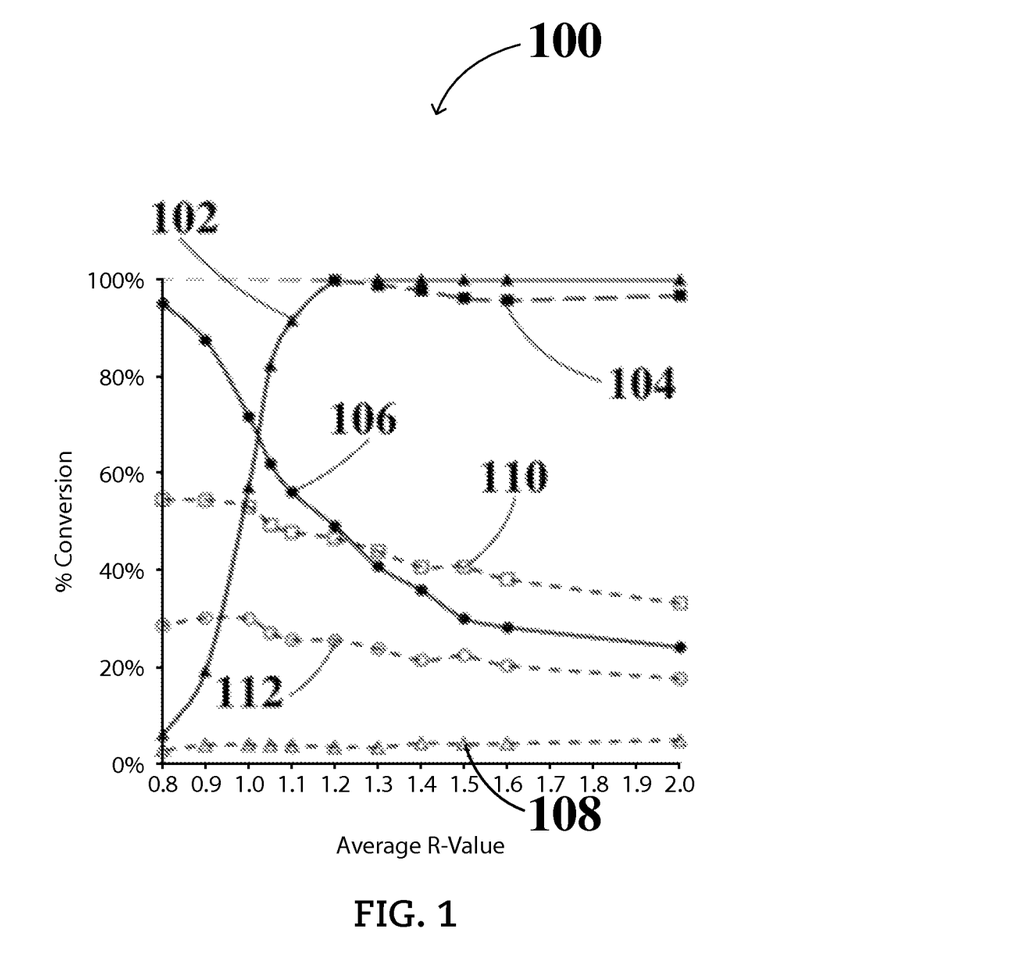
FIG. 1 shows a comparison of fresh and hydrothermally aged catalyst samples under steady state sweep condition, at inlet temperature of about 450° C. and space velocity (SV) of 40,000 h$^{-1}$, according to an embodiment.

The graph of FIG. 1 shows steady state sweep test results for disclosed ZPGM metal active phase catalyst applied in WC only. Samples may be prepared employing formulation described in Example #1. Fresh and aged samples may be tested in order to determine R-value at NO/CO cross over and NO/HC cross over, for sweep test comparison 100 with test results after applying active phase in OC, employing formulation described in Example #2, as shown in graph of FIG. 1A.

FIG. 1 shows steady state sweep test results, where fresh and aged samples may be tested in order to determine R-value at NO/CO, and NO/HC cross over, employing samples prepared according with instructions of Example #1, for applying active phase layer in WC only, which may include a formulation with stoichiometric $Cu_{1.0}Mn_2.OO_4$ spinel active phase and $Nb_2O_5$—$ZrO_2$ oxide support, with total loading of 120 g/L.

The steady state sweep test comparison 100, may be performed employing a test reactor with space velocity of 40,000 hr-1, with inlet temperature of 450° C., to simulate exhaust of standard TWC gas composition, and variable $O_2$ to adjust A/F ratio. This test was performed with 11 points sweep by variation of $O_2$ amount to change R value, sweeping from rich condition (R=2.0) to lean condition (R=0.8). The feed stream for this test is typical TWC gas composition with variable $O_2$ concentration to adjust R value of fresh and aged samples.

As may be seen in FIG. 1, the results of percent conversion of fresh samples has been designated with solid lines, and identified as fresh NO curve 102, fresh CO curve 104, and fresh HC curve 106. In fresh samples, NO/CO cross over takes place at the specific R value of 1.204, where the fresh NO/CO conversion is substantially about 99.8%. The fresh NO/HC cross over R value of 1.02, where the NO and HC conversion is about 68%.

Aged samples have been hydrothermally aged with 10% steam at about 900° C. for about 4 hours. To facilitate comparison of aged samples have been designated with broken lines, and identified as aged NO curve 108, aged CO curve 110, and aged HC curve 112. Test result for aged samples does not show cross over for NO/CO, or NO/HC. This result shows ZPGM sample with active phase in WC, Example #1 is not hydrothermally stable as the activity significantly decreased.

Figure 1A:
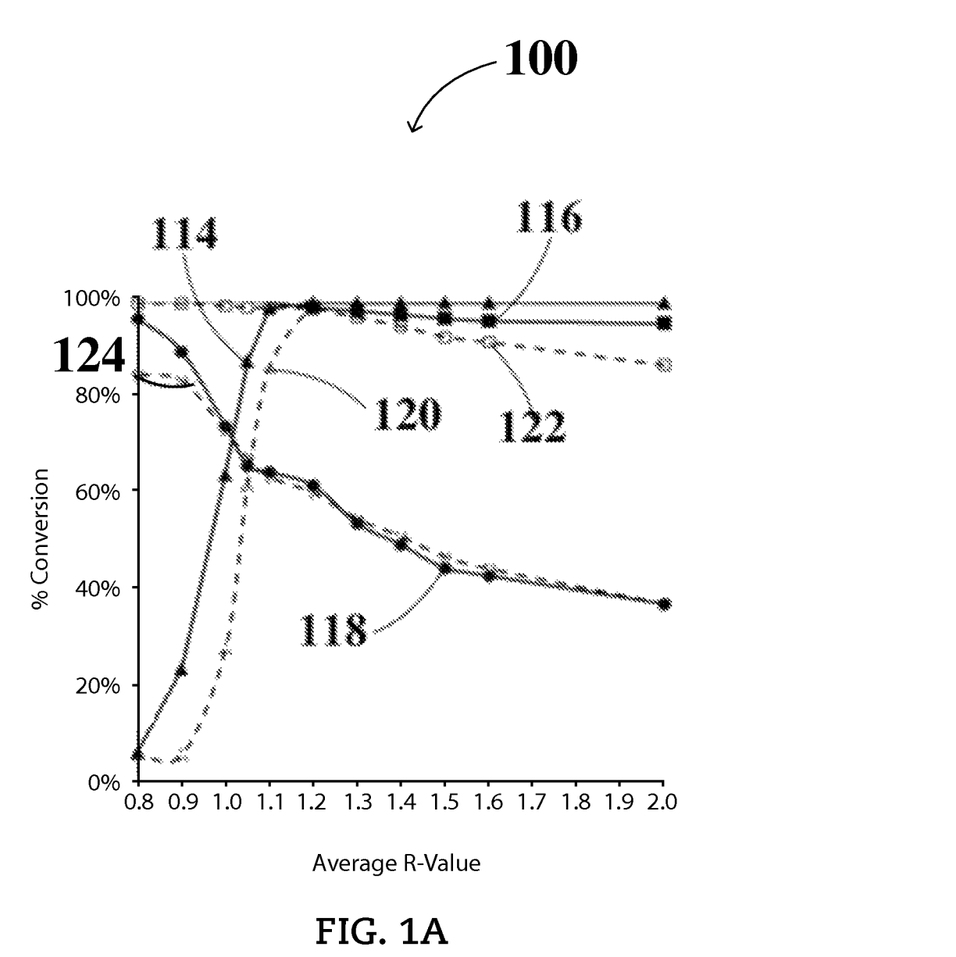

FIG. 1A shows steady state sweep test results, where fresh and aged samples may be tested in order to determine R-value at NO/CO, and NO/HC cross over, employing samples prepared according with instructions of Example #2, in which the WC may include a composition of alumina ($Al_2O_3$) and applying active phase layer in OC, with stoichiometric $Cu_{1.0}Mn_{2.0}O_4$ spinel structure and $Nb_2O_5$—$ZrO_2$ oxide support, with total loading of 120 g/L.

As may be seen in FIG. 1A, the results of percent conversion of fresh samples has been designated with solid lines, and identified as fresh NO curve 114, fresh CO curve 116, and fresh HC curve 118. In fresh samples, NO/CO cross over takes place at the specific R value of 1.15, where the NO and CO conversion is substantially about 100%. The NO/HC cross over of fresh samples, takes place at the specific R value of 1.02, with NO and HC conversion of about 72%.

Aged samples has been prepared according to procedures of Example #2, including hydrothermal aging with 10% steam at about 900° C. for about 4 hours. To facilitate comparison of aged samples have been designated with broken lines as aged NO curve 120, aged CO curve 122, and aged HC curve 124. Test result for aged samples shows a NO/CO crosses over of 1.2, where the NO and CO conversion is substantially about 99%. The NO/HC cross over is about 1.06, where the NO and HC conversion is about 68%. The results of FIG. 1A shows that ZPGM sample with active phase in OC, Example #2, has higher activity and thermal stability comparing to ZPGM sample with active phase in WC, shown in FIG. 1.

Figure 2:
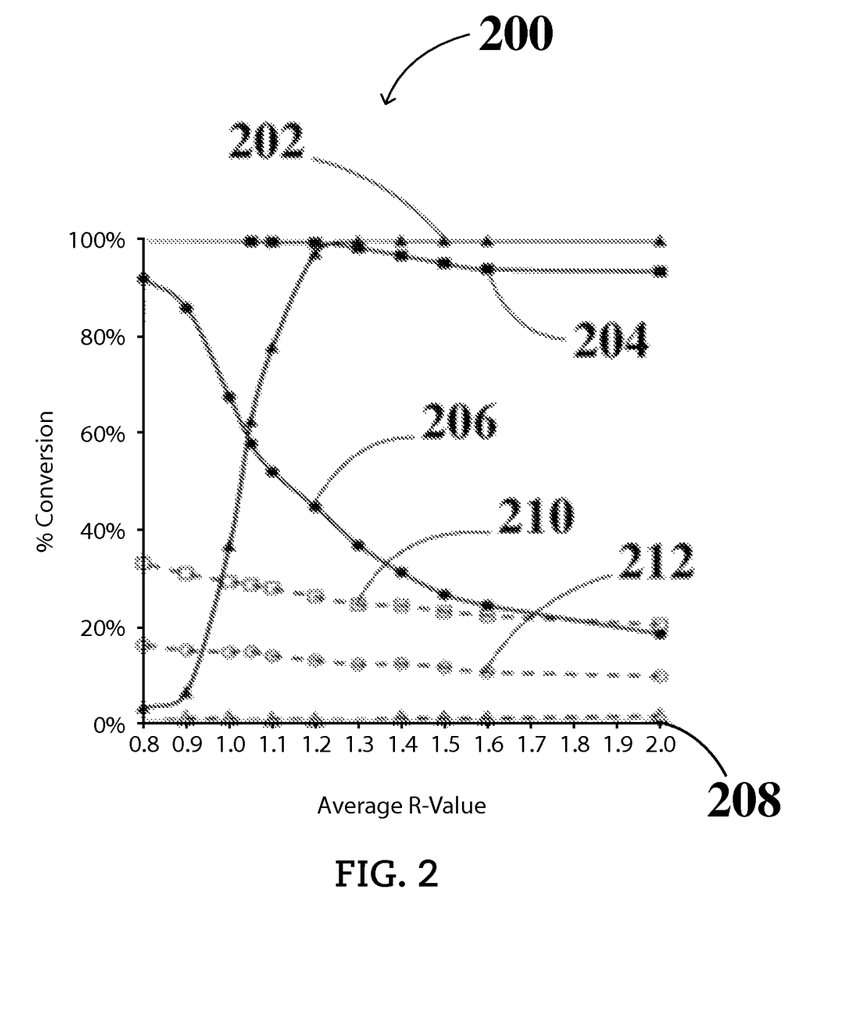
FIG. 2 depicts a comparison of fresh and hydrothermally aged catalyst samples under steady state sweep condition, at inlet temperature of about 450° C. and SV of 60,000 h$^{-1}$, according to an embodiment.

The graph of FIG. 2 shows steady state sweep test results at space velocity of 60,000 hr-1 for disclosed ZPGM active phase catalyst applied in WC only. Samples may be prepared employing formulation as described in Example #1. Fresh and aged samples may be tested in order to determine R-value at NO/CO cross over and NO/HC cross over, for sweep test comparison 200 with test results after applying active phase in OC, employing formulation described in Example #2, as shown in FIG. 2A.

As may be seen in FIG. 2, the results of percent conversion of fresh samples has been designated with solid lines, and identified as fresh NO curve 202, fresh CO curve 204, and fresh HC curve 206. In fresh samples, the NO/CO cross over takes place at the specific R-value of 1.26, where the NO and CO conversion is substantially about 99.6%. Additionally, the fresh NO/HC crosses over takes place at the specific R value of 1.05, where the fresh NO/HC conversion is substantially about 58%. This results shows, the activity of catalyst of Example #1 decreased by increasing the space velocity compare to results shown in FIG. 1.

Aged samples have been hydrothermally aged with 10% steam at about 900° C. for about 4 hours. To facilitate comparison of aged samples have been designated with broken lines as aged NO curve 208, aged CO curve 210, and aged HC curve 212. Test result for aged samples does not show crosses over for NO/CO, and not cross over for NO/HC. This result shows, ZPGM sample with active phase in WC, Example #1, is not hydrothermally stable as the activity significantly decreased, the same results as observed for lower space velocity.

Figure 2A:
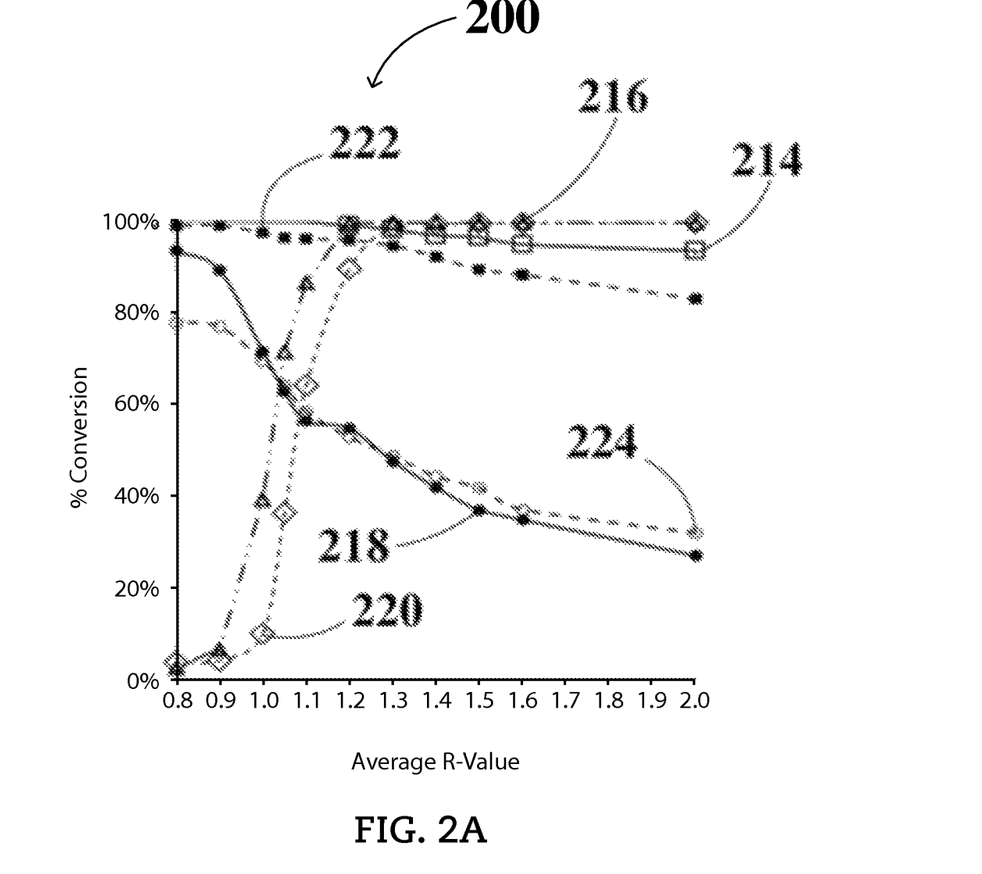

FIG. 2A shows steady state sweep test results for disclosed ZPGM metal active phase catalyst applied in OC. Samples may be prepared employing formulation as described in Example #2, illustrating the performance of NO, CO, and HC conversion employing fresh and aged samples.

As may be seen in FIG. 2A, the results of percent conversion of fresh samples has been designated with solid lines, and identified as fresh NO curve 214, fresh CO curve 216, and fresh HC curve 218. In fresh samples, NO/CO cross over takes place at the specific R-value of 1.26, where the fresh NO/CO conversion is substantially about 100%. The fresh NO/HC crosses over takes place at the specific R value of 1.04, where the fresh NO/HC conversion is substantially about 64.3%.

Aged samples have been prepared including hydrothermal aging with 10% steam at about 900° C. for about 4 hours. To facilitate comparison of aged samples have been designated with broken lines as aged NO curve 220, aged CO curve 222, and aged HC curve 224. In aged samples, NO/CO cross over takes place at the specific R value of 1.3, where the NO/CO conversion is substantially about 99%. Additionally, the NO/HC crosses over takes place at the specific R value of 1.09, where the aged NO/HC conversion is substantially about 60%. This result shows ZPGM catalyst of Example #2 is active and hydrothermally stable at higher space velocity and even after aging.

Oscillating Sweep Test Procedure

According to an embodiment, the oscillating sweep test was performed employing a test reactor at an inlet temperature of 450° C. The test covered 11 R value points from rich condition (R=2.0) to lean condition (R=0.80). Oscillating sweep test was conducted, under a frequency of 1 Hz with 0.4 AFR span, over fresh and aged samples, with simulated exhaust gas, at a space velocity (SV) of 40,000 Hr−1, to stimulate a portion of full life aging of an under-floor catalyst.

The simulated exhaust was a standard TWC gas composition that may include 8,000 ppm of CO, 400 ppm of $C_3H_6$, 100 ppm of $C_3H_8$, 1000 ppm of $NO_x$, 2000 ppm of $H_2$, 10% of $CO_2$, 10% of $H_2O$, and a quantity of $O_2$ that may be oscillated to represent the three-way condition of the control loop in an exhaust system, where the air-fuel ratio (A/F) oscillates between rich and lean conditions.

Oscillating Sweep Test of ZPGM Catalysts with Active Phase in WC or OC

Figure 3:
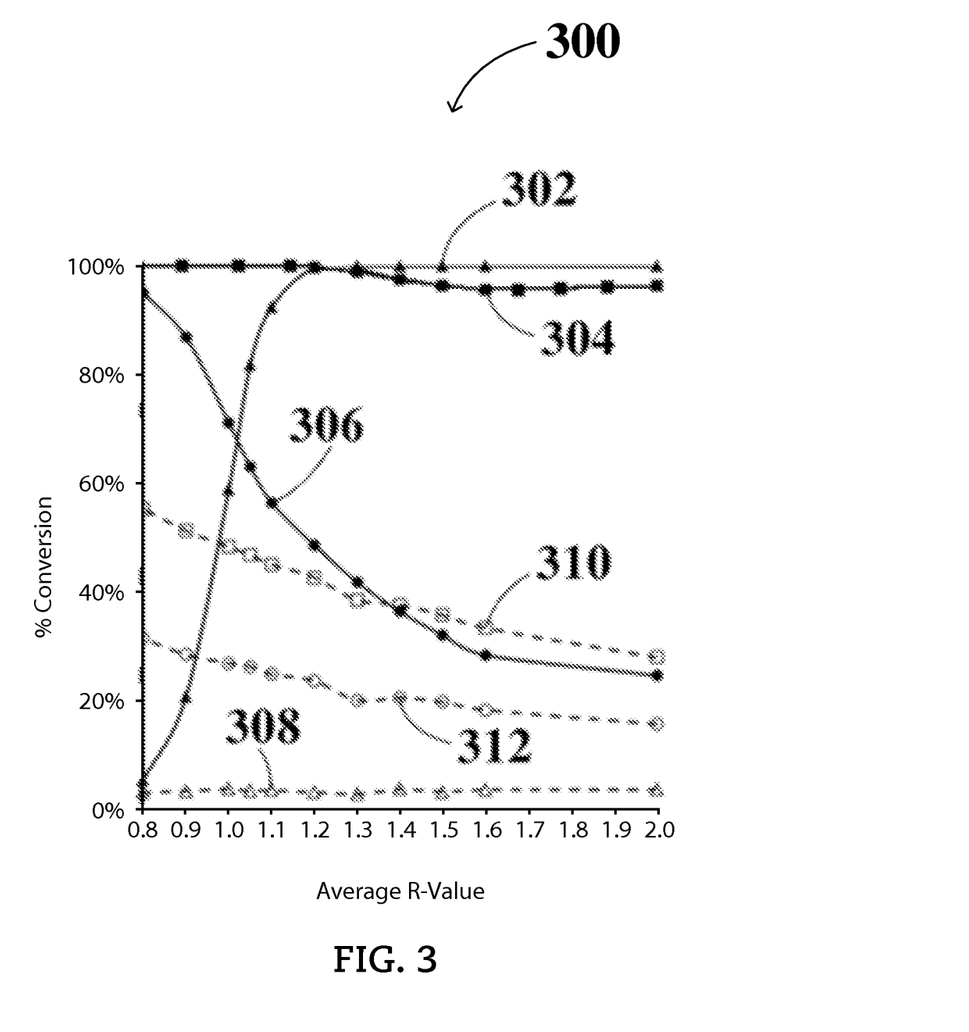
FIG. 3 shows a comparison of fresh and hydrothermally aged catalyst samples under oscillating sweep condition, at inlet temperature of about 450° C., frequency signal of 1 Hz, and SV of 40,000 h$^{-1}$, according to an embodiment.

FIG. 3 shows oscillating sweep test 300 results, where fresh and aged samples may be tested in order to determine R-value at NO/CO, and NO/HC cross over, employing samples prepared according with instructions of Example #1, for applying active phase layer in WC only. oscillating sweep test 300, which may be performed according with instructions for oscillating test procedures described above.

The test results of percent conversion of fresh samples has been designated with solid lines, and identified as fresh NO curve 302, fresh CO curve 304, and fresh HC curve 306. The NO/CO crosses over takes place at the specific R value of 1.200, where the NO and CO conversion is substantially about 99.7%. Additionally the fresh NO/HC crosses over takes place at the specific R value of 1.02, where the NO/HC conversion is substantially about 69%.

Aged samples have been prepared including hydrothermal aging with 10% steam at about 900° C. for about 4 hours. To facilitate comparison of aged samples have been designated with broken lines as aged NO curve 308, aged CO curve 310, and aged HC curve 312. Test result for aged samples does not show cross over for NO/CO, or for aged NO/HC cross over.

Figure 3A:
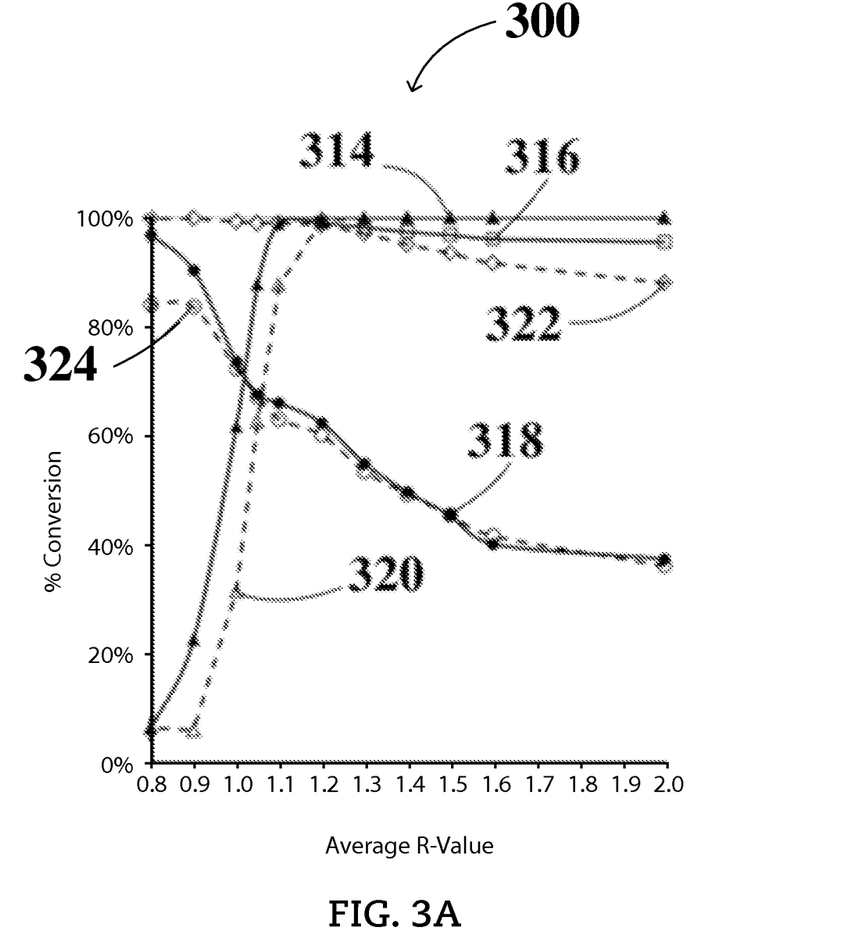

FIG. 3A shows oscillating sweep test results for disclosed ZPGM active phase catalyst applied in OC only. Samples may be prepared employing formulation as described in Example #2, illustrating the performance of NO, CO, and HC conversion employing fresh and aged samples, in which the WC may include a composition of pure alumina ($Al_2O_3$) and applying active phase layer in OC, with stoichiometric $CuMn_2O_4$ spinel structure active phase and $Nb_2O_5$—$ZrO_2$ oxide support, with total loading of 120 g/L.

As may be seen in FIG. 3A, the results of percent conversion of fresh samples has been designated with solid lines, and identified as fresh NO curve 314, fresh CO curve 316, and fresh HC curve 318. In fresh samples, NO/CO cross over takes place at the specific R value of 1.12, where the fresh NO/CO conversion is substantially about 100%. Additionally, the fresh NO/HC crosses over takes place at the specific R value of 1.02, where the NO and HC conversion is substantially about 70%.

Aged samples has been prepared by hydrothermal aging with 10% steam at about 900° C. for about 4 hours. To facilitate comparison of aged samples have been designated as aged NO curve 320, aged CO curve 322, and aged HC curve 324. In hydrothermally aged samples, NO/CO cross over takes place at the specific R value of 1.20, where the aged NO and CO conversion is substantially about 99.4%. Additionally, the NO/HC crosses over takes place at the specific R value of 1.06 with NO and HC conversion is about 66%.

Steady State Light-Off Test for ZPGM Sample

Figure 4:
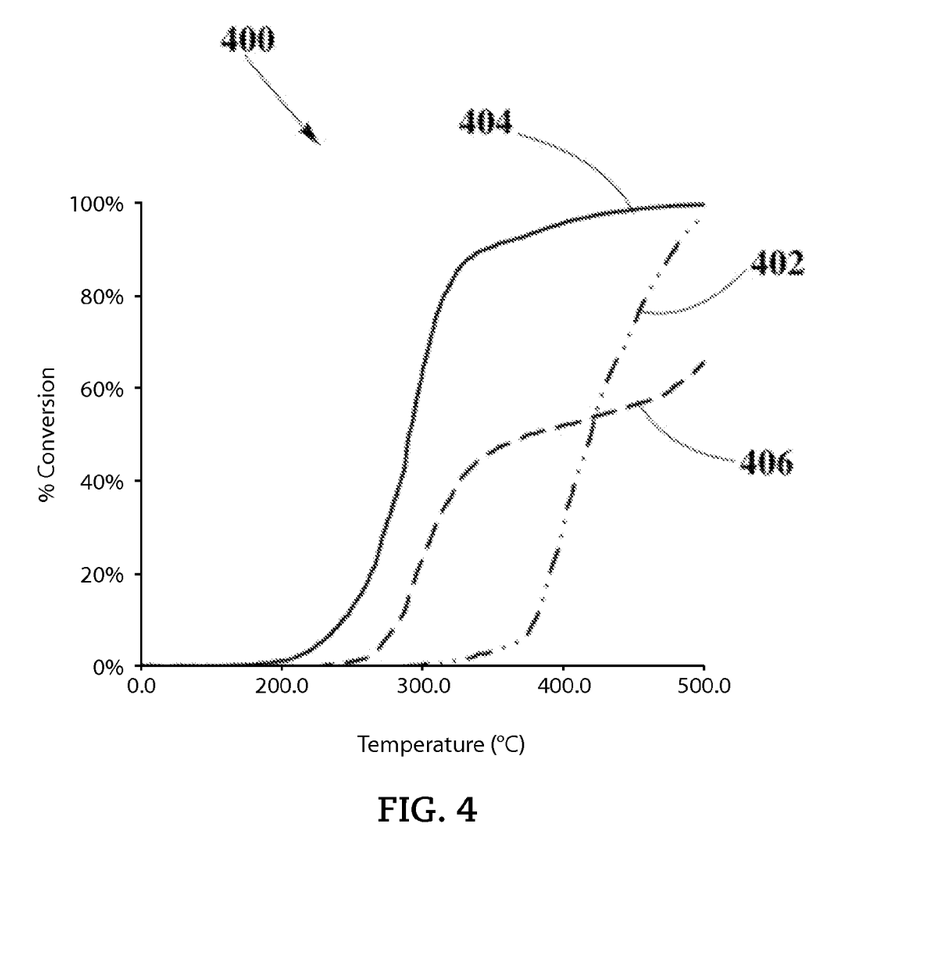
FIG. 4 depicts steady state light-off test results for hydrothermally aged catalyst samples under TWC gas condition and SV of 40,000 h$^{-1}$, according to an embodiment.

FIG. 4 illustrates the steady state light-off test 400, which was performed at NO/CO cross over value R=1.15 obtained from steady state sweep test condition from FIG. 1A. The steady state light-off test 400, have been performed employing a test reactor with space velocity of about 40,000 hr-1, at temperature range of 100° C. to about 500° C. with standard TWC gas composition in feed stream.

The steady state light off test 400 illustrates the performance in NO, CO, and HC conversion of aged samples prepared by co-precipitation method of stoichiometric Cu—Mn spinel structure active phase coated in overcoat according with procedures described in Example #2. Aged samples of Example #2 have been prepared by hydrothermal aging with 10% steam at about 900° C. for about 4 hours.

To facilitate comparison, NO conversion curve has been designated with a double dot and dash lines as NO curve 402, CO conversion curve has been designated with a solid line as CO curve 404, and HC conversion curve has been designated with dash lines as HC curve 406, As may be seen in FIG. 4, T50 of NO occurs at temperature of about 419° C., where the NO conversion reaches to 50%. T50 of CO occurs at temperature of about 290° C., where the CO conversion reaches to 50%. T50 of HC occurs at temperature of about 376° C., where the HC conversion reaches to 50%.

According to principles in the present disclosure, application of stoichiometric Cu—Mn spinel structure active phase in overcoat demonstrated higher catalytic activity, efficiency, and better performance in TWC condition compare to applying ZPGM catalyst in washcoat. In addition, disclosed ZPGM catalyst system in overcoat shows improved performance and thermal stability at different space velocity under steady state and oscillating condition, as well as presenting an enhanced behavior and thermal stability after hydrothermal aging condition.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A method for optimizing a catalytic component, comprising:
   applying to a substrate a first washcoat comprising $AL_2O_3$,
   applying to the substrate of a second washcoat or an overcoat having at least one active phase catalyst composition comprising Cu—Mn and a support oxide comprising $Nb_2O_5$-$ZrO_2$, wherein a loading of Cu—Mn in the catalyst composition is from 25 to 34%, and a loading of the $Nb_2O_5$-$ZrO_2$ in the catalyst composition is from 66 to 75%, based on a total loading of the catalyst composition.

2. The method of claim 1, wherein the substrate comprises cordierite.

3. The method of claim 1, wherein the substrate comprises ceramics.

4. The method of claim 1, wherein the substrate comprises a honeycomb structure.

5. The method of claim 1, wherein the at least one active phase catalyst is an aqueous slurry.

6. The method of claim 1, wherein the at least one active phase catalyst comprises at least one spinel structure.

7. The method of claim 1, wherein the Cu—Mn is stoichiometric.

8. The method of claim 1, wherein the at least one active catalyst is calcined at about 600° C.

9. The method of claim 1, wherein the least one active phase catalyst is substantially free from platinum group metals.

10. The method of claim 1, wherein the least one active phase catalyst is made by a co-precipitation method.

11. The method of claim 1, wherein the least one active phase catalyst is applied in the second washcoat.

12. The method of claim 11, wherein the least one active phase catalyst is applied as a powder.

13. The method of claim 11, wherein the least one active phase catalyst is applied as a slurry.

14. The method of claim 1, wherein the least one active phase catalyst has a higher catalytic activity when substantially contained in the overcoat.

15. The method of claim 1, wherein the least one active phase catalyst has a higher stability when substantially contained in the overcoat.

16. The method of claim 1, wherein a loading of Cu in the catalyst composition is from 8 to 13%.

17. The method of claim 1, wherein a loading of Mn in the catalyst composition is from 16 to 21%.

18. A method for optimizing a catalytic component, comprising:
applying to a substrate a first washcoat comprising $AL_2O_3$,
applying to the substrate of a second washcoat or an overcoat having at least one active phase catalyst composition consisting of Cu—Mn and a support oxide of $Nb_2O_5$-$ZrO_2$.

* * * * *

UNITED STATES PATENT AND TRADEMARK OFFICE
CERTIFICATE OF CORRECTION

PATENT NO. : 9,433,930 B2  
APPLICATION NO. : 14/090809  
DATED : September 6, 2016  
INVENTOR(S) : Nazarpoor Page 1 of 1

It is certified that error appears in the above-identified patent and that said Letters Patent is hereby corrected as shown below:

On the Title Page  
    Item (73) Assignee: "Clean Diesel Technologies, Inc. (CDTi), Oxnard, CA (US)" should read  
    --Clean Diesel Technologies, Inc., Oxnard, CA (US)--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*